(12) United States Patent
Shaikh

(10) Patent No.: US 8,315,216 B2
(45) Date of Patent: Nov. 20, 2012

(54) RADIO ACCESS NETWORK (RAN) CAPACITY/RESOURCE DETERMINATION

(75) Inventor: Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 711 days.

(21) Appl. No.: 12/501,010

(22) Filed: Jul. 10, 2009

(65) Prior Publication Data

US 2011/0007706 A1  Jan. 13, 2011

(51) Int. Cl.
*H04Q 7/00* (2006.01)
(52) U.S. Cl. .................................................. 370/329
(58) Field of Classification Search .................. None
See application file for complete search history.

(56) References Cited

U.S. PATENT DOCUMENTS

| | | | |
|---|---|---|---|
| 6,950,667 B2* | 9/2005 | Roy et al. | 455/511 |
| 6,968,192 B2* | 11/2005 | Longoni | 455/453 |
| 6,970,439 B2* | 11/2005 | Bi et al. | 370/329 |
| 7,096,032 B2* | 8/2006 | Roy et al. | 455/511 |
| 7,263,354 B2* | 8/2007 | Naim et al. | 455/422.1 |
| 2005/0159158 A1* | 7/2005 | Pardeep et al. | 455/436 |
| 2006/0056373 A1* | 3/2006 | Legg | 370/341 |
| 2006/0159018 A1* | 7/2006 | Park | 370/235 |
| 2006/0246933 A1* | 11/2006 | Na et al. | 455/518 |
| 2008/0080399 A1* | 4/2008 | Wang et al. | 370/254 |
| 2010/0124166 A1* | 5/2010 | Park | 370/235 |
| 2010/0234042 A1* | 9/2010 | Chan et al. | 455/453 |

* cited by examiner

*Primary Examiner* — Hassan Phillips
*Assistant Examiner* — Prenell Jones

(57) ABSTRACT

A device receives code division multiple access (CDMA) capacity/resource information via a first direct interface with a radio network controller (RNC) associated with a CDMA radio access network (RAN), and determines, based on the CDMA capacity/resource information, a capacity associated with the CDMA RAN. The device also determines, based on the CDMA capacity/resource information, a resource availability associated with the CDMA RAN, and determines, based on the capacity and the resource availability associated with the CDMA RAN, a CDMA RAN resource allocation.

25 Claims, 12 Drawing Sheets

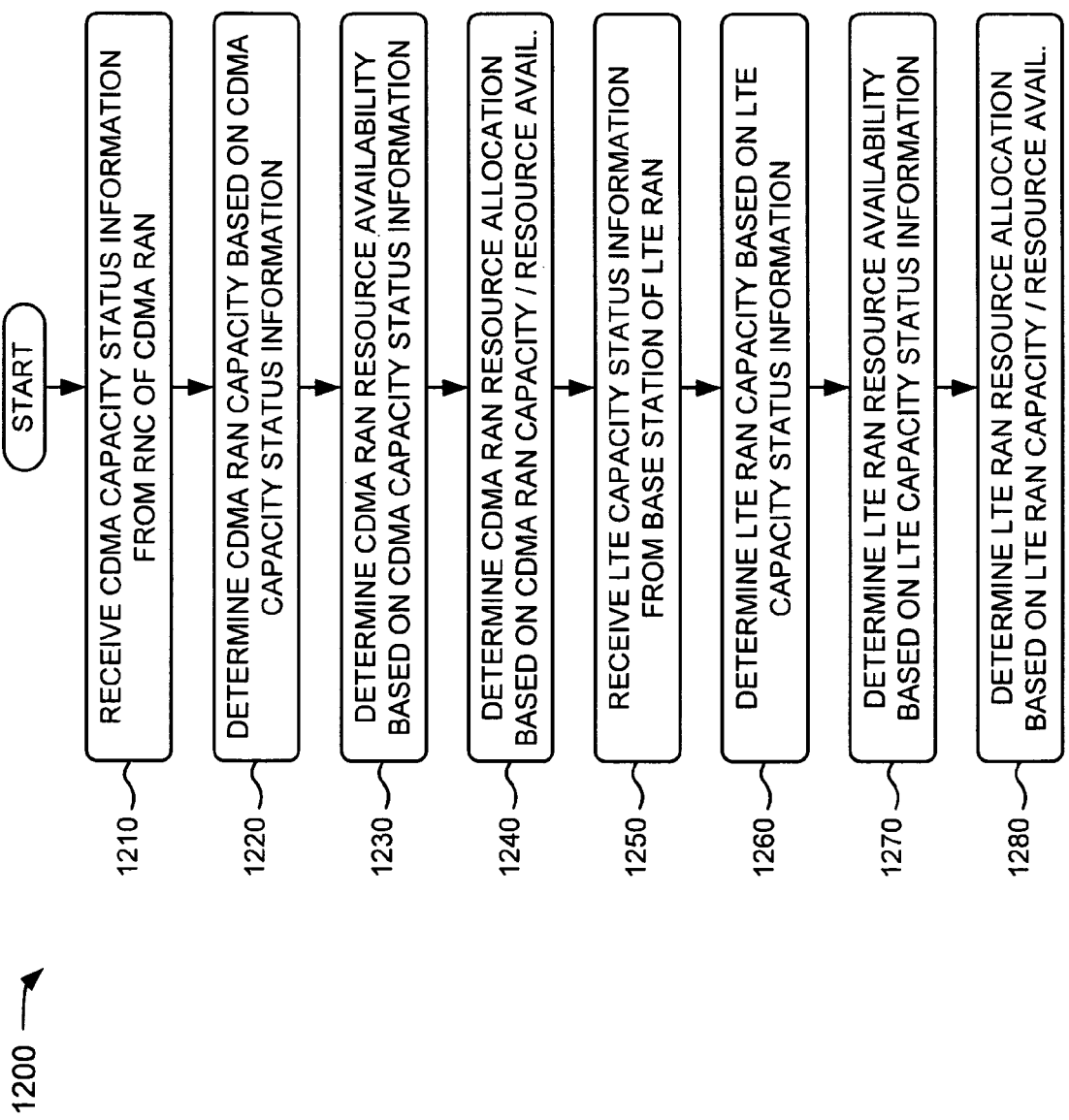

RADIO ACCESS NETWORK (RAN) CAPACITY/RESOURCE DETERMINATION

BACKGROUND

An evolved packet core (EPC) network is a communication network that includes a mobility management entity (MME), a serving gateway (SGW), a packet data network gateway (PGW), a high rate packet data (HRPD) serving gateway (HSGW), and a policy and charging rules function (PCRF). The MME is a key control node for a long term evolution (LTE) access network. Among other things, the MME is responsible for idle mode user equipment (UE) (e.g., mobile handsets) tracking and paging procedures, is involved in the bearer activation and deactivation process, and is also responsible for choosing the SGW for the UE during initial attachment and during intra-LTE handover. The MME is coupled to one or more base stations (e.g., "eNodeBs") that communicate with one or more UEs.

The SGW routes and forwards user data packets, and acts as a mobility anchor for the user plane during inter-eNodeB handovers, and as an anchor for mobility between LTE and other Third Generation Partnership Project (3GPP) technologies. For idle state UEs, the SGW terminates a downlink data path and triggers paging when downlink data arrives for the UE. The SGW manages and stores UE contexts (e.g. parameters of an Internet protocol (IP) bearer service), network internal routing information, etc.

The PGW provides connectivity from the UE to external packet data networks by being a point of exit and entry of traffic for the UE. The PGW performs policy enforcement, packet filtering for each user, charging support, lawful interception and packet screening, etc. The PGW also acts as the anchor for mobility between 3GPP and non-3GPP technologies, such as WiMAX and code division multiple access (CDMA) technologies.

The HSGW ensures converged mobility management between HRPD (e.g., CDMA) and LTE networks. The HSGW provides interworking between a HRPD access node and the PGW. In some instances, a Packet Data Serving Node (PDSN) can be integrated with or upgraded to the HSGW. The HSGW is coupled to one or more radio network controllers (RNCs or eRNCs) that communicate with one or more base stations.

The PCRF is a device designated for real-time determination of policy rules. For example, the PCRF can activate, in real-time, a set of policy rules to verify access permission, to check and debit credit balances, etc. The PCRF grants users network resources based on user subscriptions and network conditions. For LTE network access, the PCRF is aware of the PGW and the SGW resources because of direct links to (or interfaces with) the PGW and the SGW. For CDMA network access, the PCRF is aware of the HSGW because of a direct link to the HSGW.

During call set up, capacity and/or resources of bearer elements (e.g., the SGW, the PGW, the HSGW) are known to the PCRF (e.g., because of direct links and constant interactions with these bearer elements), but capacity and/or resources of RNCs and/or base stations (e.g., radio access resources) are unknown to the PCRF. When a network (e.g., via the PCRF) grants network resources to a UE for bearer, user, etc. traffic, the radio access resources are not taken into account and it is hoped that the RNCs and/or base stations will allocate appropriate resources. This arrangement works fine when the radio access network has adequate resources. However, during access network congestion (e.g., a base station is having capacity issues or congestion), mobile handsets may experience delays due to additional negotiations (e.g., messages) required to validate resources, and may even experience call failures when required access network resources are unavailable.

BRIEF DESCRIPTION OF THE DRAWINGS

FIG. 12 depicts a flow chart of another exemplary process for determining RAN capacity and/or resources and for allocating RAN resources according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that determine radio access network (RAN) conditions (e.g., capacity and/or resources) and provide the RAN conditions to other network components (e.g., to a PCRF device). The PCRF device may use the RAN conditions to efficiently assign and/or allocate network resources. In one exemplary implementation, the PCRF device may include a direct interface to a MME (e.g., associated with a LTE RAN) and/or a direct interface to a RNC (e.g., associated with a CDMA RAN). This may permit RAN capacity, resources, and/or capabilities to be known by the PCRF device at all times. In another exemplary implementation, if a PCRF device does not exist, a base station (e.g., associated with the LTE RAN) may provide its capacity status to a SGW and/or a PGW, and the RNC (e.g., associated with the CDMA RAN) may provide its capacity status to a HSGW and/or the PGW. This may permit RAN capacity, resources, and/or capabilities to be known by the SGW, HSGW, and PGW at all times.

Figure 1:
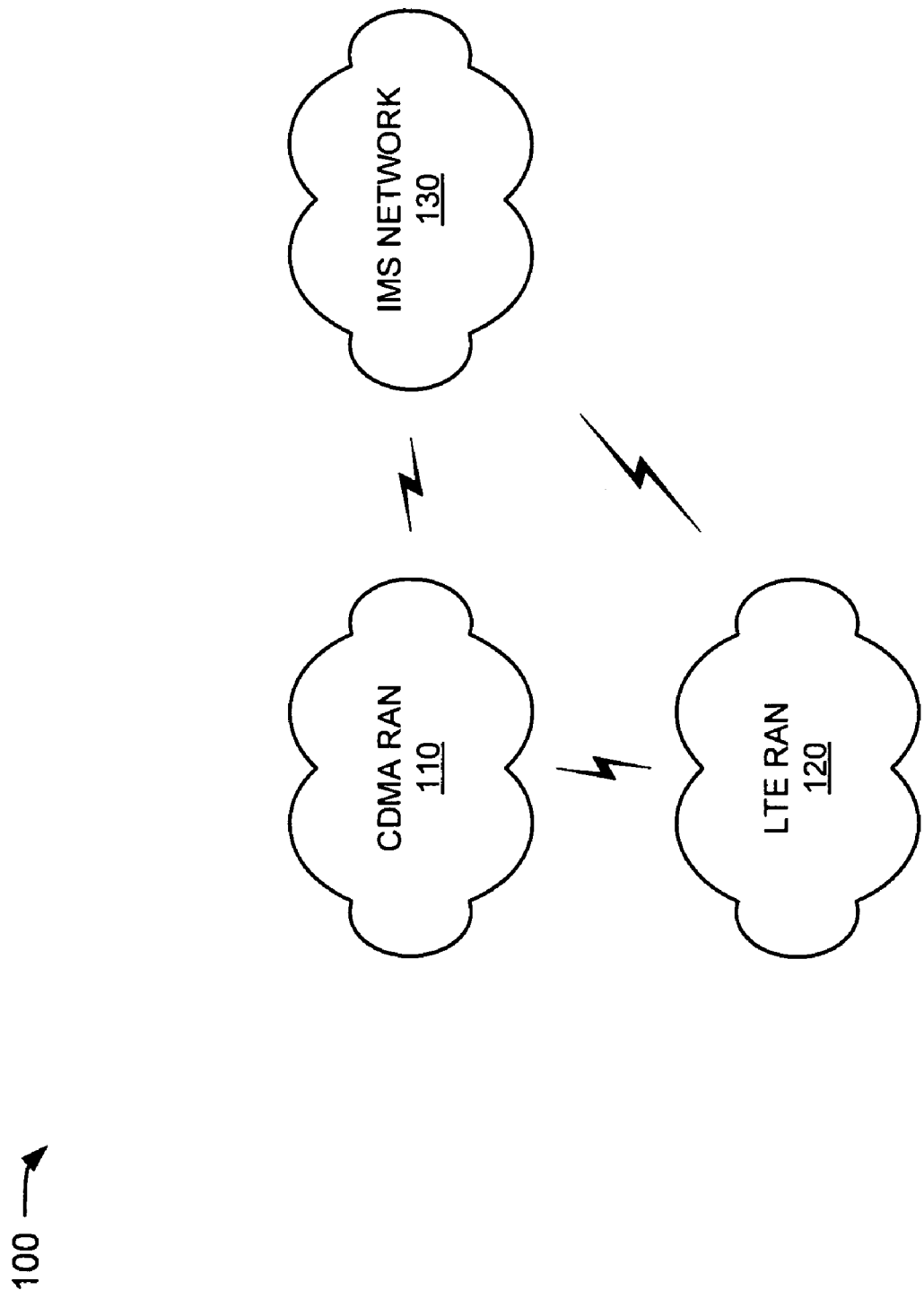
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a code division multiple access (CDMA) radio access network (RAN) 110, a long term evolution (LTE) RAN 120, and an IP multimedia subsystem (IMS) network 130. Components of network 100 may interconnect via wired and/or wireless connections. A single CDMA RAN 110, LTE RAN 120, and IMS network 130 have been illustrated in FIG. 1 for simplicity. In practice, there may be more CDMA RANs 110, LTE RANs 120, and/or IMS networks 130. Also, in some instances, one or more of the components of network 100 may perform one or more functions described as being performed by another one or more of the components of network 100.

CDMA RAN 110 may implement a channel access method utilized by various radio communication technologies. CDMA RAN 110 may permit several transmitters to send information simultaneously over a single communication channel, which allows several users to share a bandwidth of frequencies. CDMA RAN 110 may employ a spread-spectrum technology and a special coding scheme (e.g., where each transmitter is assigned a code) to allow multiple users to be multiplexed over the same physical channel. CDMA RAN 110 may provide a form of "spread-spectrum" signaling since the modulated coded signal may have a much higher data bandwidth than the data being communicated. In one exemplary implementation, CDMA RAN 110 may include a HRPD access network. Further details of CDMA RAN 110 are provided below in connection with, for example, FIG. 2.

LTE RAN 120 may include a RAN that provides downlink peak rates of at least on-hundred megabits per second (Mbit/s), uplink peak rates of at least fifty Mbit/s, and RAN round-trip times of less than ten milliseconds (ms). LTE RAN 120 may support flexible carrier bandwidths (e.g., from 1.4 megahertz (MHz) up to twenty MHz), as well as both Frequency Division Duplexing (FDD) and Time Division Duplex (TDD). LTE RAN 120 may improve spectral efficiency, lower costs, improve services, make use of new spectrum and reformed spectrum opportunities, and better integrate with other open standards. LTE RAN 120 may provide high throughput and low latency. LTE RAN 120 may also support seamless connection to existing networks, such as CDMA RAN 110.

In one exemplary implementation, LTE RAN 120 may include one or more PCRF devices. A PCRF device may include a device or entity that grants users access to network resources (e.g., of network 100) based on user subscriptions and network conditions. For CDMA RAN 110 access, the PCRF may be aware of a HSGW (e.g., associated with LTE RAN 120) because of a direct link to the HSGW. For LTE RAN 120 access, the PCRF may be aware of a PGW and a SGW (e.g., associated with LTE RAN 120) because of direct links to (or interfaces with) the PGW and the SGW. The PCRF device may include a direct interface to a MME (e.g., associated with LTE RAN 120) and/or a direct interface to a RNC (e.g., associated with CDMA RAN 110). This may permit RAN capacity, resources, and/or capabilities (e.g., RAN conditions) to be known by the PCRF device at all times. The PCRF device may use the RAN conditions to efficiently assign and/or allocate network 100 resources. Further details of LTE RAN 120 are provided below in connection with, for example, FIG. 3.

IMS network 130 may include an architectural framework for delivering IP multimedia services. To ease the integration with the Internet, IMS network 130 may use protocols (e.g., Session Initiation Protocol (SIP)) wherever possible. IMS network 130 may aid access of multimedia and voice applications from wireless terminals (e.g., associated with CDMA RAN 110 and/or LTE RAN 120) and wireline terminals by having a horizontal control layer that isolates an access network from a service layer. Further details of IMS network 130 are provided below in connection with, for example, FIG. 4.

Figure 2:
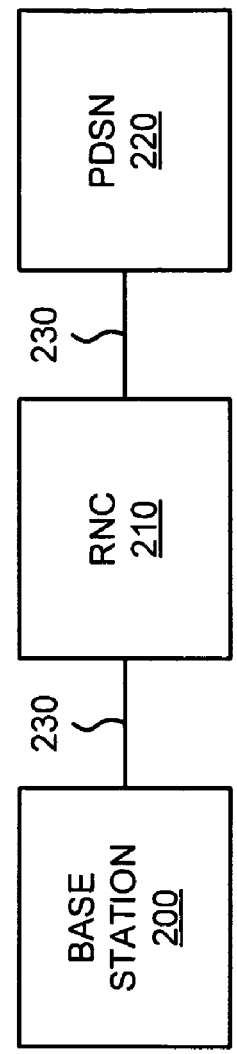
FIG. 2 illustrates a diagram of exemplary components of a CDMA radio access network (RAN) of the network depicted in FIG. 1.

FIG. 2 illustrates a diagram of exemplary components of CDMA RAN 110. As shown, CDMA RAN 110 may include a base station 200, a RNC 210, and a packet data serving node (PDSN) 220 interconnected by links 230.

Base station 200 may include a device that receives voice and/or data from RNC 210 and transmits that voice and/or data to user equipment (not shown) via an air interface. Base station 200 may also include a device that receive voice and/or data from user equipment over an air interface and transmits that voice and/or data to RNC 210 or other user equipment. In one embodiment, base station 200 may generate one or more cells (e.g., in network 100) that may provide service to user equipment.

RNC 210 may include a device that controls and manages base station 200. RNC 210 may also include a device that performs data processing to manage utilization of radio network services. RNC 210 may transmit/receive voice and data to/from base station 200, other RNCs, and/or PDSN 220. RNC 210 may act as a controlling radio network controller (CRNC), a drift radio network controller (DRNC), or a serving radio network controller (SRNC). A CRNC may be responsible for controlling the resources of base station 200. On the other hand, an SRNC may serve particular user equipment and may manage connections towards that user equipment. Likewise, a DRNC may fulfill a similar role to the SRNC (e.g., may route traffic between a SRNC and particular user equipment).

PDSN 220 may include a device that acts as a connection point between a radio access network (e.g., CDMA RAN 110) and an IP network. For example, PDSN 220 may include a network device, such as a gateway, a router, a switch, a firewall, a network interface card (NIC), a hub, a bridge, a proxy server, or some other type of device that processes and/or transfers data. PDSN 220 may manage point-to-point protocol (PPP) sessions between a mobile provider's IP network and user equipment (e.g., a cell phone) connected to base station 200. PDSN 220 may act as an access gateway, may provide foreign agent support, and may provide packet transport for virtual private networking. In one example, PDSN 110 may include a 1xRTT (radio transmission technology) PDSN, an evolution-data optimized (EVDO) PDSN, etc.

Links 230 may include wired or wireless communication paths. In one exemplary implementation, links 230 may include communication paths for bearer traffic (e.g., voice, data, etc. traffic).

Although FIG. 2 shows exemplary components of CDMA RAN 110, in other implementations, CDMA RAN 110 may contain fewer, different, differently arranged, or additional components than depicted in FIG. 2. In still other implementations, one or more components of CDMA RAN 110 may perform one or more other tasks described as being performed by one or more other components of CDMA RAN 110.

Figure 3:
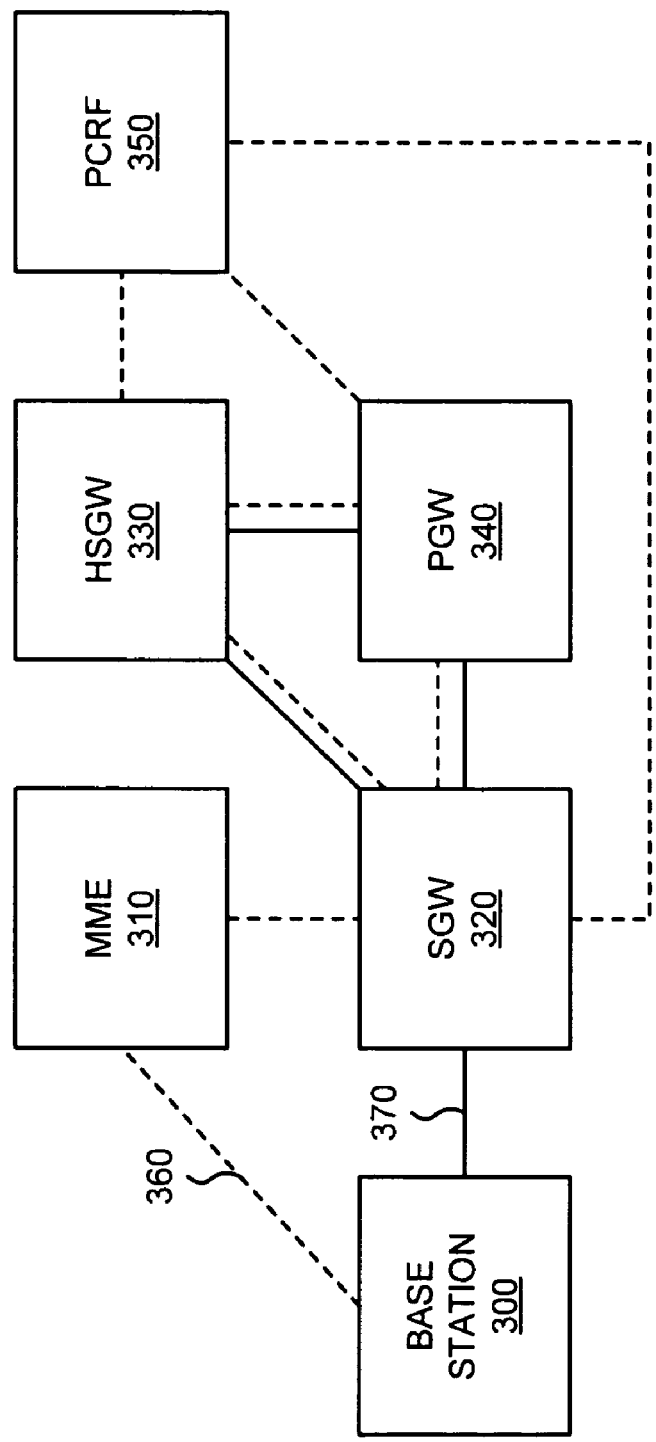
FIG. 3 depicts a diagram of exemplary components of a LTE RAN illustrated in Fig. 1.

FIG. 3 depicts a diagram of exemplary components of LTE RAN 120. As shown, LTE RAN 120 may include a base station 300, a MME 310, a SGW 320, a HSGW 330, a PGW 340, and a PCRF 350 interconnected by one or more links 360 and/or 370.

Base station 300 may include a device that receives voice and/or data from SGW 320 and transmits that voice and/or data to user equipment (not shown) via an air interface. Base station 300 may also include a device that receive voice and/or data from user equipment over an air interface and transmits that voice and/or data to SGW 320 or other user equipment. In one embodiment, base station 300 may generate one or more cells (e.g., in network 100) that may provide service to user equipment.

MME 310 may include a computation and/or communication device that is responsible for idle mode user equipment tracking and paging procedures (e.g., for identifying base station 300 for paging active or idle user equipment), is involved in a bearer activation/deactivation process, and is also responsible for choosing a SGW and/or a PGW for user equipment during initial attachment and during intra-LTE handover. MME 310 may communicate, via link 360, with one or more base stations (e.g., base station 300) that communicate with one or more UEs. MME 310 may provide control plane signaling to user equipment, may perform ciphering and integrity protection services (e.g., signaling security), and may authenticate devices.

SGW 320 may include a computation and/or communication device that routes and forwards user datagrams (e.g., any type or form of data, such as packet or non-packet data), and acts as a mobility anchor for the user plane during inter-base station handovers and as an anchor for mobility between LTE and other 3GPP technologies. For idle state user equipment, SGW 320 may terminate a downlink data path and buffer downlink data that arrives for the user equipment. SGW 320 may manage and store user equipment contexts, network internal routing information, etc. SGW 320 may perform a mobile access gateway function for proxy mobile Internet protocol (PMIP), and may provide lawful intercept capabilities. SGW 320 may perform uplink and downlink transport level packet marking (e.g., differentiated services code point (DSCP)) based on a quality of service (QoS) class identifier (QCI) for bearer traffic. SGW 320 may also perform accounting on user and QCI granularity for inter-operator charging.

HSGW 330 may include a computation and/or communication device that routes and forwards user datagrams, and acts as a mobility anchor for the user plane during inter-RNC handovers. For idle state user equipment, HSGW 330 may terminate a downlink data path and buffer downlink data that arrives for the user equipment. HSGW 330 may perform a mobile access gateway function for PMIP mobility, may provide lawful intercept capabilities, and may provide support for robust header compression (ROHC). HSGW 330 may perform a policy enforcement function as defined in policy and charging control (PCC) architecture. HSGW 330 may perform uplink and downlink transport level packet marking (e.g., DSCP) based on a QCI for bearer traffic. HSGW 330 may perform accounting on user and QCI granularity for inter-operator charging, and may provide an EAP-AKA (extensible authentication protocol method for Universal Mobile Telecommunications System (UMTS) authentication and key agreement) authenticator function. HSGW 330 may also provide uplink and downlink bearer binding, and may support HRPD to LTE handoff.

PGW 340 may include a computation and/or communication device that provides connectivity from user equipment to external packet data networks by being a point of exit and entry of traffic for the user equipment. PGW 340 may act as a PMIP local mobility anchor (e.g., provide an evolved packet core (EPC) home agent function), may assign device IP addresses, and may use deep packet inspection to filter per-user based packets. PGW 340 may also provide uplink and downlink service level charging and accounting, gating control, and/or rate enforcement (e.g., rate policing and shaping). PGW 340 may perform uplink and downlink transport level packet marking (e.g., DSCP) based on a QCI for bearer traffic, and may perform downlink rate enforcement based on aggregate maximum bit rates.

PCRF 350 may include a computation and/or communication device that determines policy rules in real time. For example, PCRF 350 may activate, in real-time, a set of policy rules to verify access permission, to check and debit credit balances, etc. PCRF 350 may grant network resources (e.g., components, devices, links, etc. of network 100) to users based on user subscriptions and/or network conditions. For CDMA RAN 110 access, PCRF 350 may be aware of HSGW 330 and PGW 340 because of direct links to (or interfaces with) HSGW 330 and PGW 340. For LTE RAN 120 access, PCRF 350 may be aware of SGW 320 and PGW 340 capacity/resources because of direct links to (or interfaces with) SGW 320 and PGW 340.

Links 360 and 370 may include wired or wireless communication paths. In one exemplary implementation, links 360 (dashed lines) may include communication paths for signaling traffic (e.g., control traffic), and links 370 (solid lines) may include communication paths for bearer traffic (e.g., voice, data, etc. traffic).

Although FIG. 3 shows exemplary components of LTE RAN 120, in other implementations, LTE RAN 120 may contain fewer, different, differently arranged, or additional components than depicted in FIG. 3. In still other implementations, one or more components of LTE RAN 120 may perform one or more other tasks described as being performed by one or more other components of LTE RAN 120.

Figure 4:
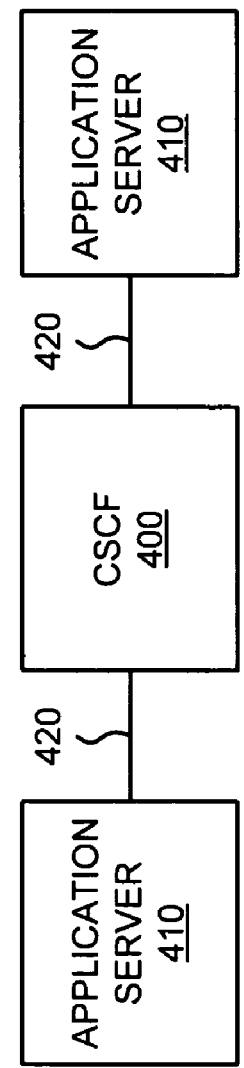
FIG. 4 illustrates a diagram of exemplary components of an IP multimedia subsystem (IMS) network depicted in FIG. 1.

FIG. 4 illustrates a diagram of exemplary components of IMS network 130. As shown, IMS network 130 may include a call session control function (CSCF) 400 and one or more application servers 410 interconnected by one or more links 420.

CSCF 400 may include a computation and/or communication device or entity that processes SIP signaling packets in IMS network 130. CSCF 400 may include a proxy-CSCF, a serving-CSCF, and/or an interrogating-CSCF. A proxy-CSCF may inspect signaling messages, and may authenticate a user and establish a security association with the user. Also, the proxy-CSCF may compress and decompress SIP messages, may authorize media plane resources over the media plane, and may generate charging records. A serving-CSCF may handle SIP registrations, may inspect signaling messages, and may decide to which application server 410 a SIP message will be forwarded. An interrogating-CSCF may query a home subscriber server (HSS) to retrieve a user, and may route a SIP request to its assigned serving-CSCF.

Each of application servers 410 may include a computation and/or communication device that hosts and executes services, and interfaces with a serving-CSCF using SIP. Each of application servers 410 can operate in SIP proxy mode, SIP user agent (UA) mode, and/or SIP back-to-back user agent (B2BUA) mode. Each of application servers 410 may be located in a home network or in an external third-party network. If located in the home network, application server 410 may query the HSS.

Links 420 may include wired or wireless communication paths. In one exemplary implementation, links 420 may include communication paths for traffic (e.g., voice, data, etc. traffic).

Although FIG. 4 shows exemplary components of IMS network 130, in other implementations, IMS network 130 may contain fewer, different, differently arranged, or additional components than depicted in FIG. 4. In still other implementations, one or more components of IMS network 130 may perform one or more other tasks described as being performed by one or more other components of IMS network 130.

Figure 5:
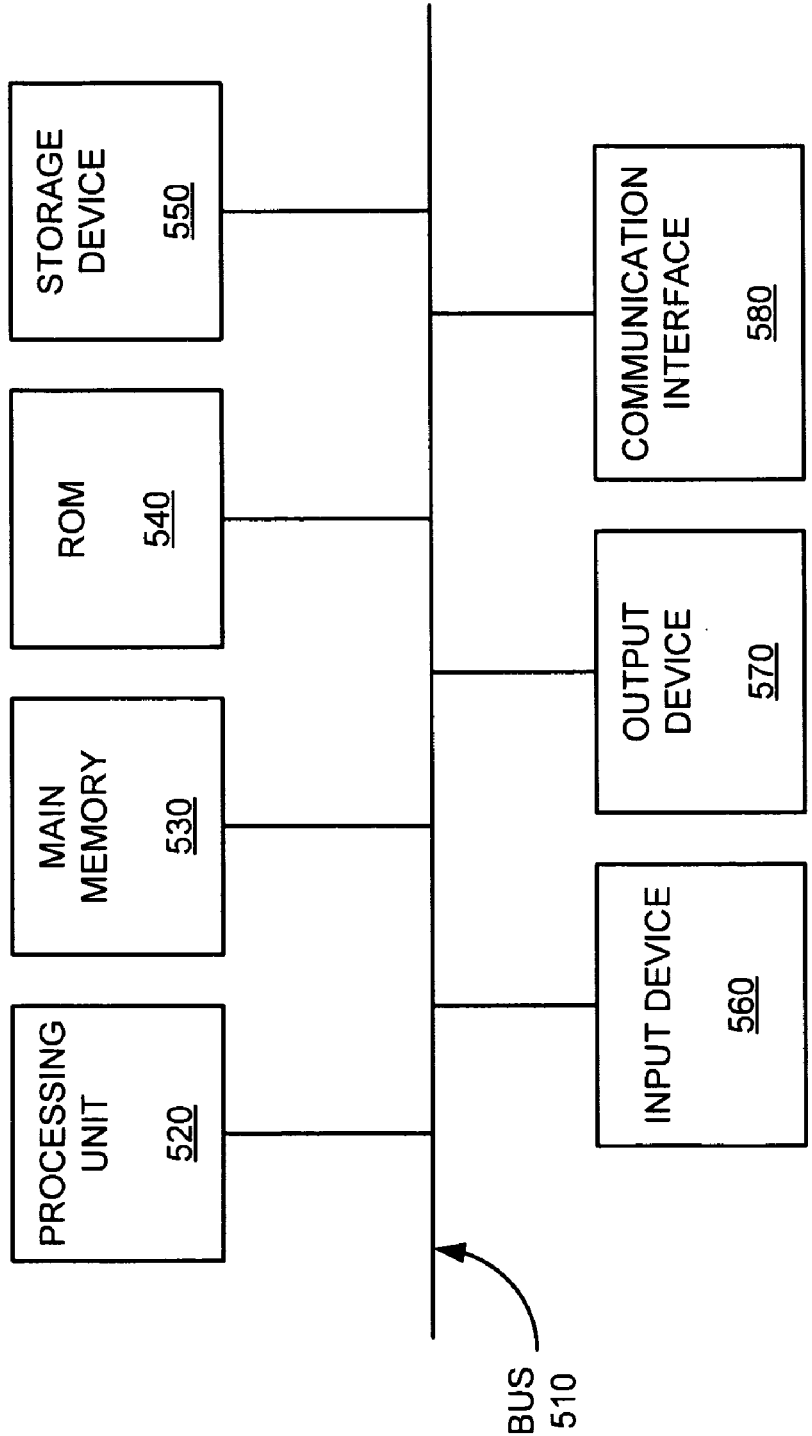
FIG. 5 depicts a diagram of exemplary components of a RNC of the CDMA RAN illustrated in FIG. 2, and/or of a MME, a PGW, and/or a PCRF of the LTE RAN illustrated in FIG. 3.

FIG. 5 is an exemplary diagram of a device 500 that may correspond to RNC 210, MME 310, PGW 340, and/or PCRF 350. As illustrated, device 500 may include a bus 510, a processing unit 520, a main memory 530, a read-only memory (ROM) 540, a storage device 550, an input device 560, an output device 570, and/or a communication interface 580. Bus 510 may include a path that permits communication among the components of device 500.

Processing unit 520 may include one or more processors, microprocessors, or other types of processing units that may interpret and execute instructions. Main memory 530 may include one or more random access memories (RAMs) or other types of dynamic storage devices that may store information and instructions for execution by processing unit 520. ROM 540 may include one or more ROM devices or other types of static storage devices that may store static information and/or instructions for use by processing unit 520. Storage device 550 may include a magnetic and/or optical recording medium and its corresponding drive.

Input device 560 may include a mechanism that permits an operator to input information to device 500, such as a keyboard, a mouse, a pen, a microphone, voice recognition and/or biometric mechanisms, a remote control, a touch screen, etc. Output device 570 may include a mechanism that outputs information to the operator, including a display, a printer, a speaker, etc. Communication interface 580 may include any transceiver-like mechanism that enables device 500 to communicate with other devices and/or systems. For example, communication interface 580 may include mechanisms for communicating with another device or system via a network.

As described herein, device 500 may perform certain operations in response to processing unit 520 executing software instructions contained in a computer-readable medium, such as main memory 530. A computer-readable medium may be defined as a physical or logical memory device. A logical memory device may include memory space within a single physical memory device or spread across multiple physical memory devices. The software instructions may be read into main memory 530 from another computer-readable medium, such as storage device 550, or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows exemplary components of device 500, in other implementations, device 500 may contain fewer, different, differently arranged, or additional components than depicted in FIG. 5. In still other implementations, one or more components of device 500 may perform one or more other tasks described as being performed by one or more other components of device 500.

Figure 6:
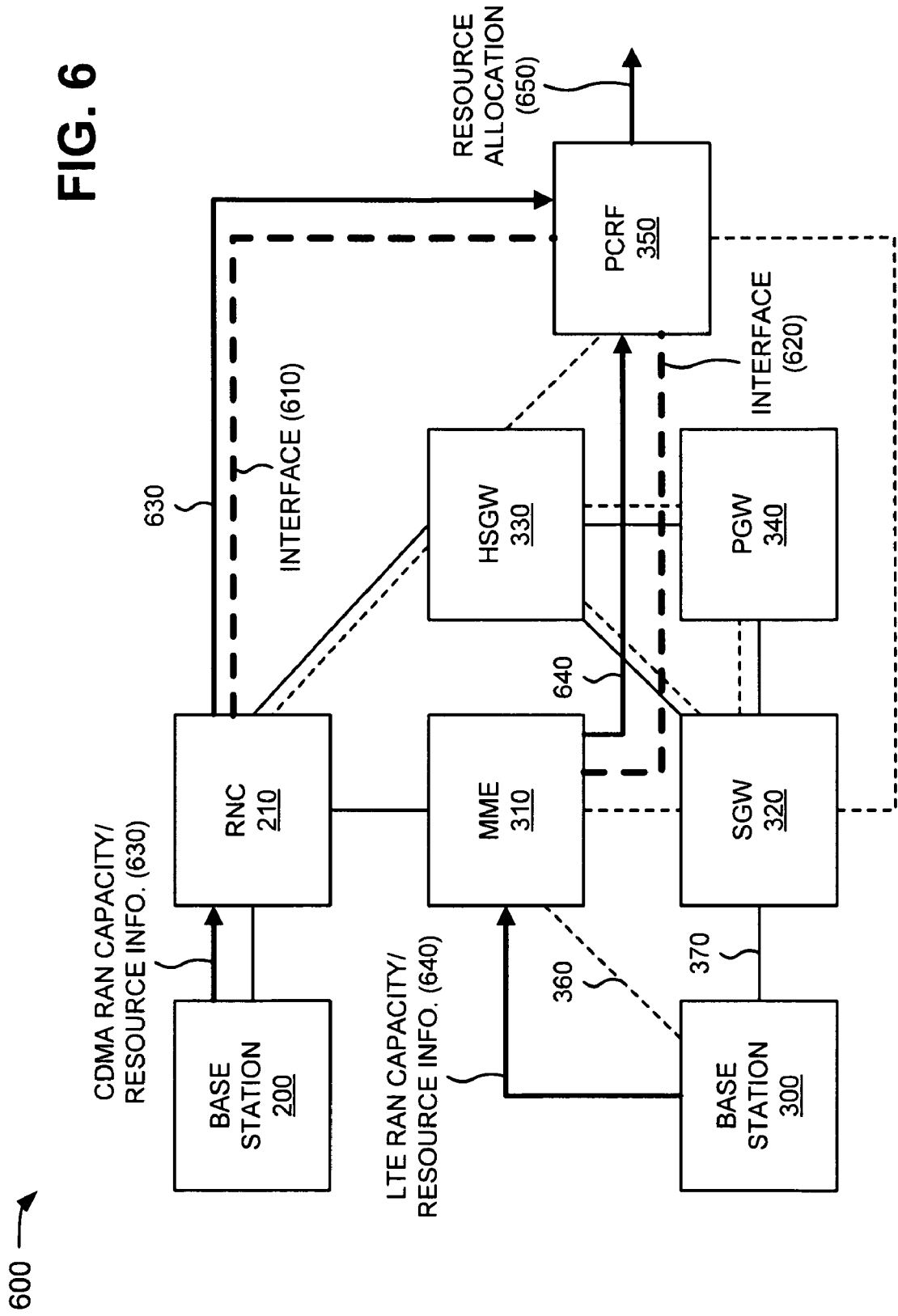
FIG. 6 illustrates a diagram of exemplary interactions among components of an exemplary portion of the network depicted in FIGS. 1-3.

FIG. 6 illustrates a diagram of exemplary interactions among components of an exemplary portion 600 of network 100. As shown, exemplary network portion 600 may include base station 200, RNC 210, base station 300, MME 310, SGW 320, HSGW 330, PGW 340, and PCRF 350. Base station 200 and RNC 210 may include the features described above in connection with, for example, FIG. 2. Base station 300, MME 310, SGW 320, HSGW 330, PGW 340, and PCRF 350 may include the features described above in connection with, for example, FIG. 3.

As further shown in FIG. 6, PCRF 350 may include (or establish) a direct interface 610 to RNC 210 (e.g., of CDMA RAN 110), and may include (or establish) a direct interface 620 to MME 310 (e.g., of LTE RAN 120). Interface 610 may provide a wired or wireless communication link between RNC 210 and PCRF 350 so that capacity, resources, and capabilities of CDMA RAN 110 may be provided to and/or be known by PCRF 350. Interface 620 may provide a wired or wireless communication link between MME 310 and PCRF 350 so that capacity, resources, and capabilities of LTE RAN 120 may be provided to and/or be known by PCRF 350.

Base station 200 (and/or other devices associated with CDMA RAN 110) may provide CDMA RAN capacity/resource information 630 to RNC 210. CDMA RAN capacity/resource information 630 may include capacity information (e.g., number of cells, number of voice channels, percent of cells in use, percent of voice channels in use, etc.), resource availability information (e.g., number of base stations, number of other devices, etc.), etc. associated with CDMA RAN 110. RNC 210 may forward CDMA RAN capacity/resource information 630 to PCRF 350 via interface 610. Such an arrangement may permit PCRF 350 to have knowledge of CDMA RAN 110 capacity, resources, capabilities, etc. In one exemplary implementation, PCRF 350 may receive CDMA RAN capacity/resource information 630 from RNC 210, and may determine the capacity information and/or the resource availability information, associated with CDMA RAN 110, based on CDMA RAN capacity/resource information 630.

As further shown in FIG. 6, base station 300 (and/or other devices associated with LTE RAN 120) may provide LTE RAN capacity/resource information 640 to MME 310. LTE RAN capacity/resource information 640 may include capacity information (e.g., number of cells, number of voice channels, percent of cells in use, percent of voice channels in use, etc.), resource availability information (e.g., number of base stations, number of other devices, etc.), etc. associated with LTE RAN 120. MME 310 may forward LTE RAN capacity/resource information 640 to PCRF 350 via interface 620. Such an arrangement may permit PCRF 350 to have knowledge of LTE RAN 120 capacity, resources, capabilities, etc. In one exemplary implementation, PCRF 350 may receive LTE RAN capacity/resource information 640 from MME 310, and may determine the capacity information and/or the resource availability information, associated with LTE RAN 120, based on LTE RAN capacity/resource information 640.

PCRF 350 may determine a resource allocation 650 for network portion 600 based on the capacity information and/or the resource availability information associated with CDMA RAN 110 or with LTE RAN 120. Resource allocation 650 may include information defining which resources of network portion 600 to use to route traffic (e.g., voice, data, etc.) to/from user equipment (e.g., mobile telephones). Resource allocation 650 may be based not only on capacity/resource availability associated with SGW 320, HSGW 330, PGW 340, but also on capacity/resource availability associated with components of CDMA RAN 110 (e.g., base station 200, RNC 210, etc.) and components of LTE RAN 120 (e.g., base station 300, MME 310, etc.). In one example, during call set up, PCRF 350 may grant bearer resources (e.g., allocate resources) to user equipment (e.g., mobile telephones) based on resource allocation 650. This may reduce call set up time, minimize call failures, and permit network portion 600 to be end-to-end "resource aware."

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
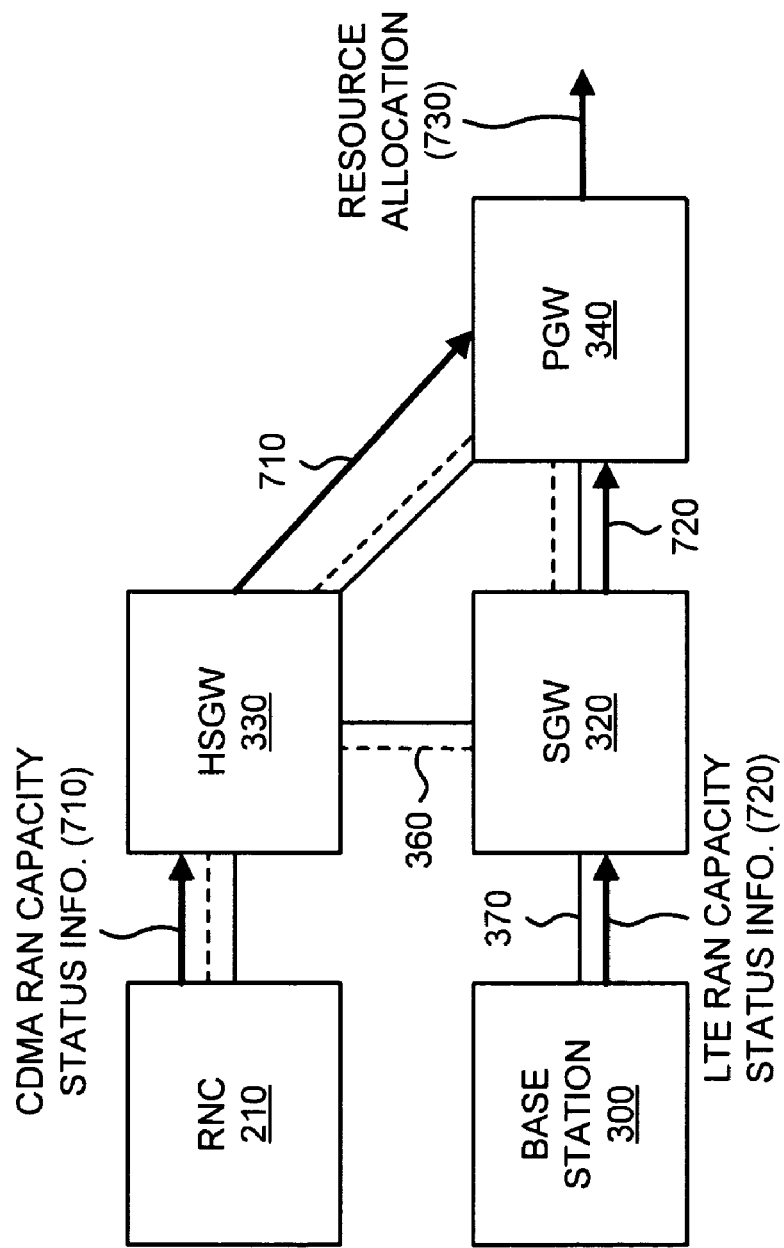
FIG. 7 depicts a diagram of exemplary interactions among components of another exemplary portion of the network depicted in FIGS. 1-3.

FIG. 7 depicts a diagram of exemplary interactions among components of another exemplary portion 700 of network 100. As shown, exemplary network portion 700 may include RNC 210, base station 300, SGW 320, HSGW 330, and PGW 340. RNC 210 may include the features described above in connection with, for example, FIG. 2. Base station 300, SGW 320, HSGW 330, and PGW 340 may include the features described above in connection with, for example, FIG. 3. PCRF 350 may be omitted from network portion 700 since some wireless providers may deploy an evolved packet core (EPC) network without a PCRF.

Since PCRF 350 is omitted from network portion 700, information associated with RNC 210 of CDMA RAN 110 may need to be known to HSGW 330 and PGW 340 (e.g., for CDMA-based communications) and information associated with base station 300 of LTE RAN 120 may need to be known to SGW 320 and PGW 340 (e.g., for LTE-based communications). This may be accomplished, as shown in FIG. 7, by RNC 210 periodically providing CDMA RAN capacity status information 710 to HSGW 330 and by base station 300 periodically providing LTE RAN capacity status information 720 to SGW 320. In one implementation, CDMA RAN capacity status information 710 and/or LTE RAN capacity status information 720 may be provided at periodic intervals (e.g., every minute, every ten minutes, etc.). Alternatively and/or additionally, CDMA RAN capacity status information 710 and/or LTE RAN capacity status information 720 may be provided prior to a call setup by network portion 700.

CDMA RAN capacity status information 710 may include capacity status information (e.g., number of cells, number of voice channels, percent of cells in use, percent of voice channels in use, available cells, available voice channels, etc.) associated with CDMA RAN 110. LTE RAN capacity status information 720 may include capacity status information (e.g., number of cells, number of voice channels, percent of cells in use, percent of voice channels in use, available cells, available voice channels, etc.) associated with LTE RAN 120.

As further shown in FIG. 7, HSGW 330 may provide CDMA RAN capacity status information 710 to PGW 340, and SGW 320 may provide LTE RAN capacity status information 720 to PGW 340. PGW 340 may receive CDMA RAN capacity status information 710, and may determine capacity information (e.g., number of cells, number of voice channels, percent of cells in use, percent of voice channels in use, etc.) and/or resource availability information (e.g., number of base stations, number of other devices, etc.), associated with CDMA RAN 110, based on CDMA RAN capacity status information 710. Also, PGW 340 may receive LTE RAN capacity status information 720, and may determine capacity information (e.g., number of cells, number of voice channels, percent of cells in use, percent of voice channels in use, etc.) and/or resource availability information (e.g., number of base stations, number of other devices, etc.), associated with LTE RAN 120, based on LTE RAN capacity status information 720.

PGW 340 may determine a resource allocation 730 for network portion 700 based on the capacity information and/or the resource availability information associated with CDMA RAN 110 or with LTE RAN 120. Resource allocation 730 may include information defining which resources of network portion 700 to use to route traffic (e.g., voice, data, etc.) to/from user equipment (e.g., mobile telephones). Resource allocation 730 may be based not only on capacity/resource availability associated with SGW 320, HSGW 330, PGW 340, but also on capacity/resource availability associated with components of CDMA RAN 110 (e.g., RNC 210) and components of LTE RAN 120 (e.g., base station 300). In one example, during call set up, PGW 340 may grant bearer resources to user equipment (e.g., mobile telephones) based on resource allocation 730. This may reduce call set up time, minimize call failures, and permit network portion 700 to be end-to-end "resource aware."

Although FIG. 7 shows exemplary components of network portion 700, in other implementations, network portion 700 may contain fewer, different, differently arranged, or additional components than depicted in FIG. 7. In still other implementations, one or more components of network portion 700 may perform one or more other tasks described as being performed by one or more other components of network portion 700.

Figure 8:
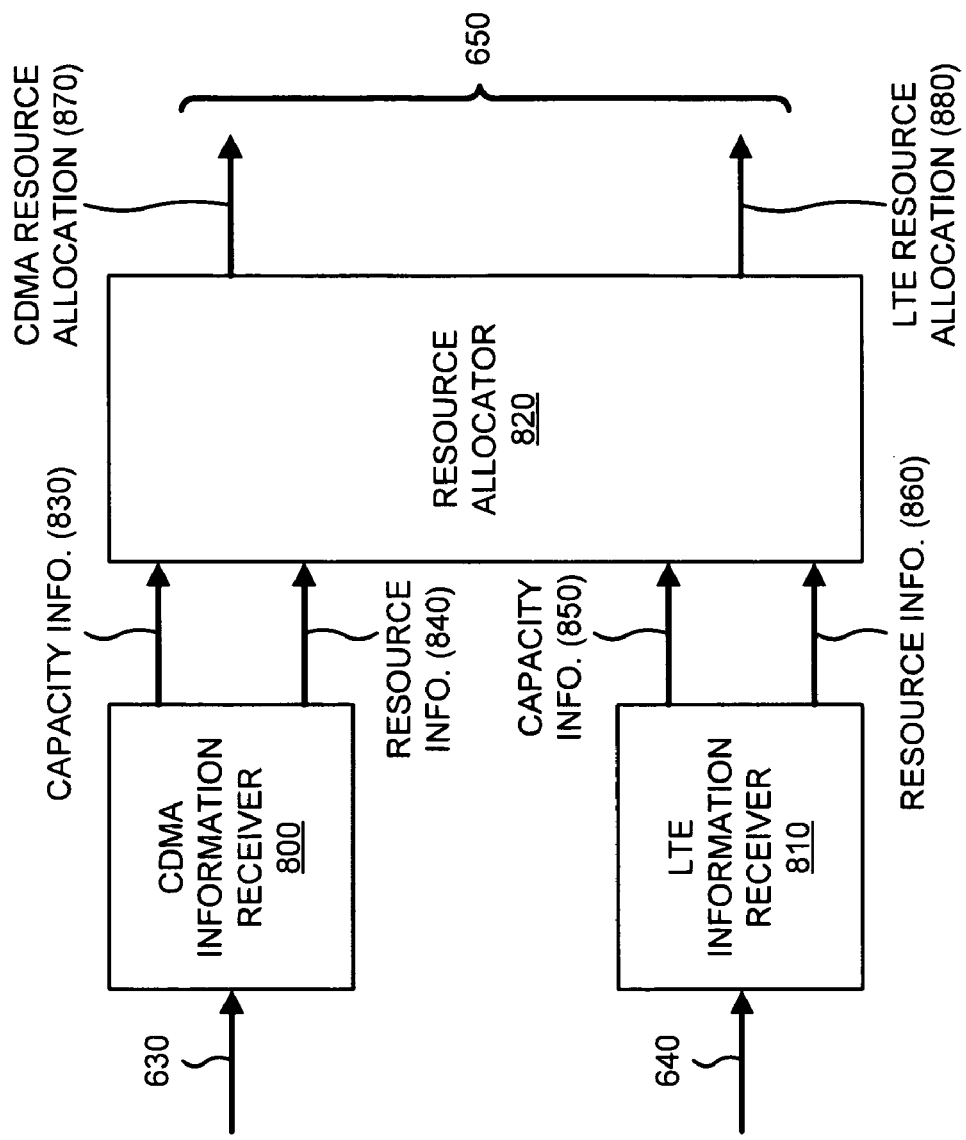
FIG. 8 illustrates a diagram of exemplary functional components of the PCRF of the LTE RAN depicted in FIG. 3.

FIG. 8 illustrates a diagram of exemplary functional components of PCRF 350. In one implementation, the functions described in connection with FIG. 8 may be performed by one or more components of device 500 (FIG. 5). As shown in FIG. 8, PCRF 350 may include a CDMA information receiver 800, a LTE information receiver 810, and a resource allocator 820.

CDMA information receiver 800 may include hardware or a combination of hardware and software that may receive CDMA RAN capacity/resource information 630 from RNC 210, and may generate capacity information 830 and resource availability information 840 based on CDMA RAN capacity/resource information 630. Capacity information 830 may include, for example, a number of cells, a number of voice channels, a percent of cells in use, a percent of voice channels in use, etc. associated with CDMA RAN 110. Resource availability information 840 may include, for example, a number of base stations, a number of other devices, etc. associated with CDMA RAN 110. CDMA information receiver 800 may provide capacity information 830 and resource availability information 840 to resource allocator 820.

LTE information receiver 810 may include hardware or a combination of hardware and software that may receive LTE RAN capacity/resource information 640 from MME 310, and may generate capacity information 850 and resource availability information 860 based on LTE RAN capacity/resource information 640. Capacity information 850 may include, for example, a number of cells, a number of voice channels, a percent of cells in use, a percent of voice channels in use, etc. associated with LTE RAN 120. Resource availability information 860 may include, for example, a number of base stations, a number of other devices, etc. associated with LTE RAN 120. LTE information receiver 810 may provide capacity information 850 and resource availability information 860 to resource allocator 820.

Resource allocator 820 may include hardware or a combination of hardware and software that may receive capacity information 830 and resource availability information 840 from CDMA information receiver 800, and may receive capacity information 850 and resource availability information 860 from LTE information receiver 810. Resource allocator 820 may determine a CDMA resource allocation 870 based on capacity information 830 and resource availability information 840, and may determine a LTE resource allocation 880 based on capacity information 850 and resource availability information 860. CDMA resource allocation 870 may include information defining which resources of CDMA RAN 110 (e.g., base station 200) to use to route traffic (e.g., voice, data, etc.) to/from user equipment (e.g., mobile telephones). LTE resource allocation 880 may include information defining which resources of LTE RAN 120 (e.g., base station 300) to use to route traffic (e.g., voice, data, etc.) to/from user equipment (e.g., mobile telephones). As further shown in FIG. 8, CDMA resource allocation 870 and LTE resource allocation 880 may be included in resource allocation 650 (FIG. 6), although resource allocation 650 may include information defining which other resources of network 100 to use to route traffic to/from user equipment.

Although FIG. 8 shows exemplary functional components of PCRF 350, in other implementations, PCRF 350 may contain fewer, different, differently arranged, or additional functional components than depicted in FIG. 8. In still other implementations, one or more functional components of PCRF 350 may perform one or more other tasks described as being performed by one or more other functional components of PCRF 350.

Figure 9:
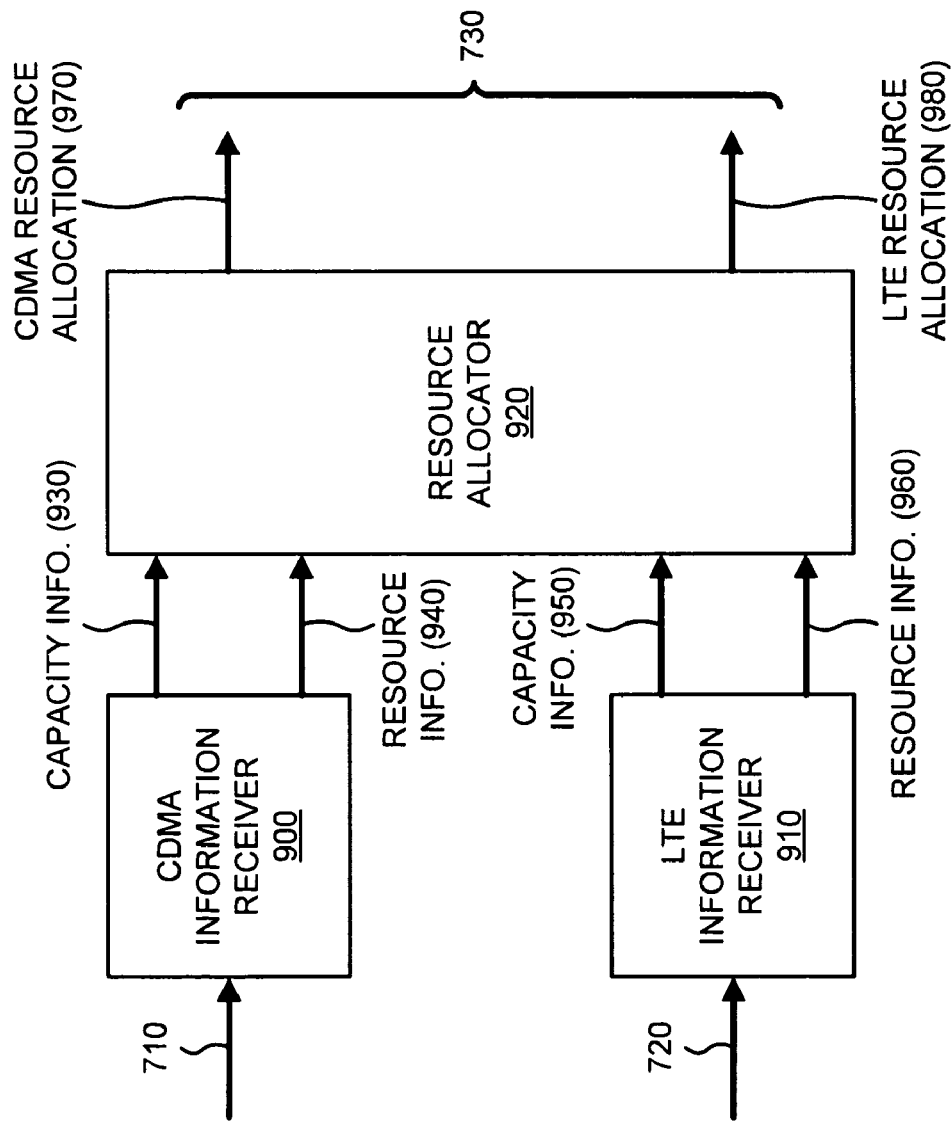
FIG. 9 depicts a diagram of exemplary functional components of the PGW of the LTE RAN illustrated in FIG. 3.

FIG. 9 depicts a diagram of exemplary functional components of the PGW 340. In one implementation, the functions described in connection with FIG. 9 may be performed by one or more components of device 500 (FIG. 5). As shown in FIG. 9, PGW 340 may include a CDMA information receiver 900, a LTE information receiver 910, and a resource allocator 920.

CDMA information receiver 900 may include hardware or a combination of hardware and software that may receive CDMA RAN capacity status information 710 from HSGW 330, and may generate capacity information 930 and resource availability information 940 based on CDMA RAN capacity status information 710. Capacity information 930 may include, for example, a number of cells, a number of voice channels, a percent of cells in use, a percent of voice channels in use, etc. associated with CDMA RAN 110. Resource availability information 940 may include, for example, a number of base stations, a number of other devices, etc. associated with CDMA RAN 110. CDMA information receiver 900 may provide capacity information 930 and resource availability information 940 to resource allocator 920.

LTE information receiver 910 may include hardware or a combination of hardware and software that may receive LTE RAN capacity status information 720 from SGW 320, and may generate capacity information 950 and resource availability information 960 based on LTE RAN capacity status information 720. Capacity information 950 may include, for example, a number of cells, a number of voice channels, a percent of cells in use, a percent of voice channels in use, etc. associated with LTE RAN 120. Resource availability information 960 may include, for example, a number of base stations, a number of other devices, etc. associated with LTE RAN 120. LTE information receiver 910 may provide capacity information 950 and resource availability information 960 to resource allocator 920.

Resource allocator 920 may include hardware or a combination of hardware and software that may receive capacity information 930 and resource availability information 940 from CDMA information receiver 900, and may receive capacity information 950 and resource availability information 960 from LTE information receiver 910. Resource allocator 920 may determine a CDMA resource allocation 970 based on capacity information 930 and resource availability information 940, and may determine a LTE resource allocation 980 based on capacity information 950 and resource availability information 960. CDMA resource allocation 970 may include information defining which resources of CDMA RAN 110 (e.g., base station 200) to use to route traffic (e.g., voice, data, etc.) to/from user equipment (e.g., mobile telephones). LTE resource allocation 980 may include information defining which resources of LTE RAN 120 (e.g., base station 300) to use to route traffic (e.g., voice, data, etc.) to/from user equipment (e.g., mobile telephones). As further shown in FIG. 9, CDMA resource allocation 970 and LTE resource allocation 980 may be included in resource allocation 730 (FIG. 7), although resource allocation 730 may include information defining which other resources of network 100 to use to route traffic to/from user equipment.

Although FIG. 9 shows exemplary functional components of PGW 340, in other implementations, PGW 340 may contain fewer, different, differently arranged, or additional functional components than depicted in FIG. 9. In still other implementations, one or more functional components of PGW 340 may perform one or more other tasks described as being performed by one or more other functional components of PGW 340.

Figure 10:
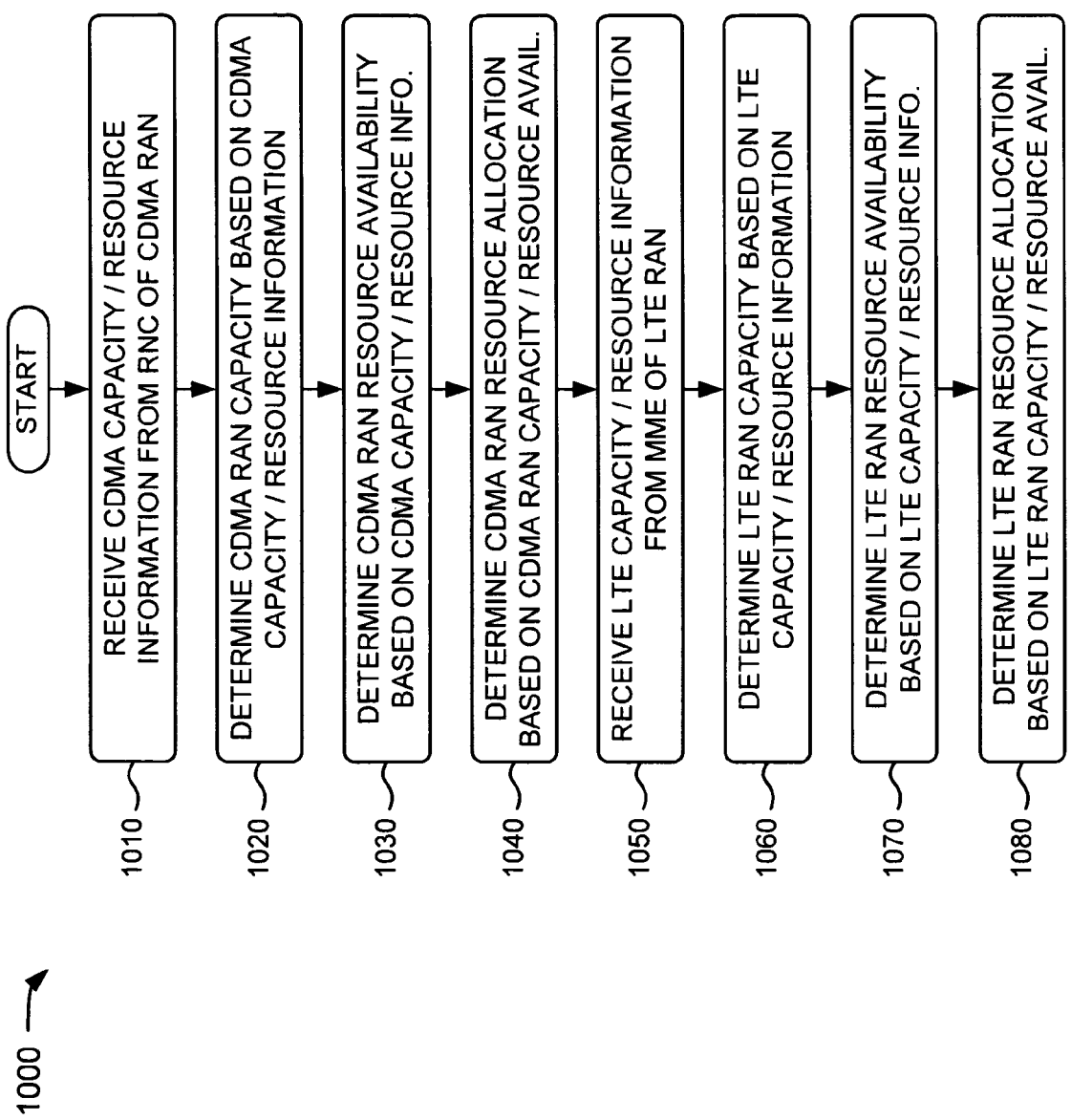
FIGS. 10 and 11 illustrate flow charts of an exemplary process for determining RAN capacity and/or resources and for allocating RAN resources according to implementations described herein.
Figure 11:
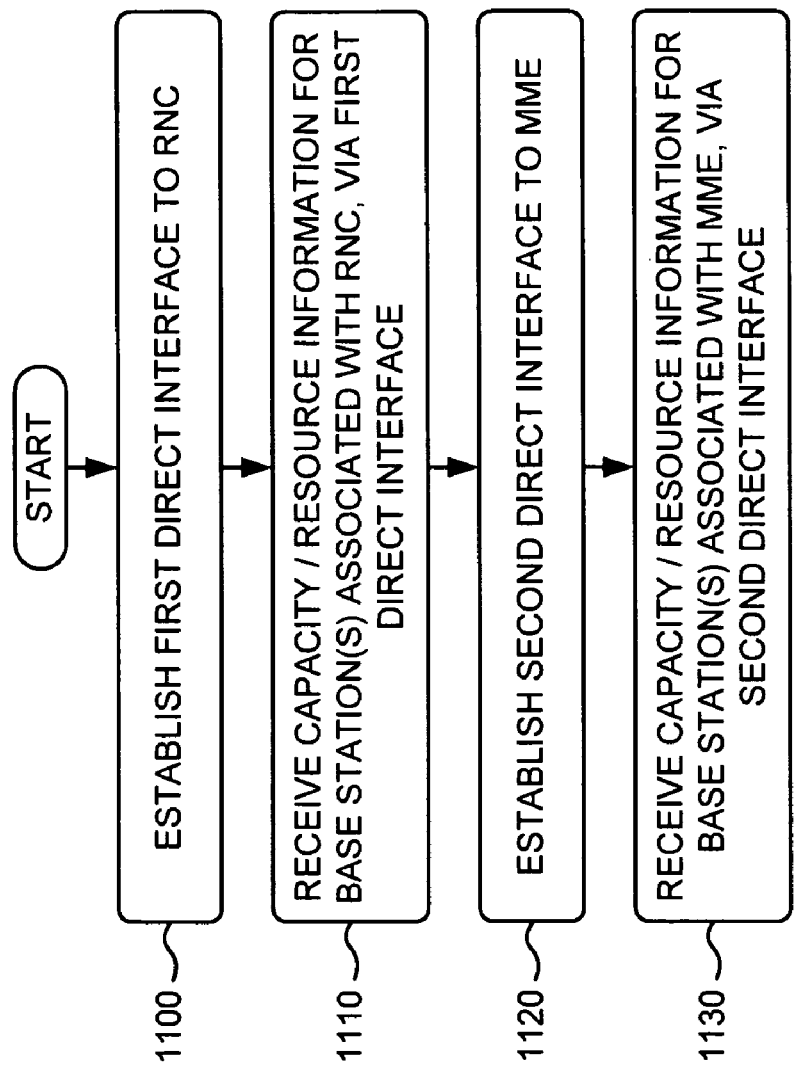

FIGS. 10 and 11 illustrate flow charts of an exemplary process 1000 for determining RAN capacity and/or resources and for allocating RAN resources according to implementations described herein. In one implementation, process 1000 may be performed by PCRF 350. In another implementation, some or all of process 900 may be performed by another device or group of devices, including or excluding PCRF 350.

As illustrated in FIG. 10, process 1000 may include receiving CDMA capacity/resource information from a RNC of a CDMA RAN (block 1010), and determining a capacity associated with the CDMA RAN based on the CDMA capacity/resource information (block 1020). For example, in implementations described above in connection with FIG. 8, CDMA information receiver 800 of PCRF 350 may receive CDMA RAN capacity/resource information 630 from RNC 210, and may generate capacity information 830 based on CDMA RAN capacity/resource information 630. Capacity information 830 may include, for example, a number of cells, a number of voice channels, a percent of cells in use, a percent of voice channels in use, etc. associated with CDMA RAN 110.

As further shown in FIG. 10, resource availability associated with the CDMA RAN may be determined based on the CDMA capacity/resource information (block 1030), and a resource allocation associated with the CDMA RAN may be determined based on the CDMA RAN capacity and the CDMA RAN resource availability (block 1040). For example, in implementations described above in connection with FIG. 8, CDMA information receiver 800 of PCRF 350 may generate resource availability information 840 based on CDMA RAN capacity/resource information 630. Resource availability information 840 may include, for example, a number of base stations, a number of other devices, etc. associated with CDMA RAN 110. Resource allocator 820 of PCRF 350 may determine CDMA resource allocation 870 based on capacity information 830 and resource availability information 840. CDMA resource allocation 870 may include information defining which resources of CDMA RAN 110 (e.g., base station 200) to use to route traffic (e.g., voice, data, etc.) to/from user equipment (e.g., mobile telephones).

Returning to FIG. 10, LTE capacity/resource information may be received from a MME of a LTE RAN (block 1050), and a capacity associated with the LTE RAN may be determined based on the LTE capacity/resource information (block 1060). For example, in implementations described above in connection with FIG. 8, LTE information receiver 810 of PCRF 350 may receive LTE RAN capacity/resource information 640 from MME 310, and may generate capacity information 850 based on LTE RAN capacity/resource information 640. Capacity information 850 may include, for example, a number of cells, a number of voice channels, a percent of cells in use, a percent of voice channels in use, etc. associated with LTE RAN 120.

As further shown in FIG. 10, resource availability associated with the LTE RAN may be determined based on the LTE capacity/resource information (block 1070), and a resource allocation associated with the LTE RAN may be determined based on the LTE RAN capacity and the LTE RAN resource availability (block 1080). For example, in implementations described above in connection with FIG. 8, LTE information receiver 810 of PCRF 350 may generate resource availability information 860 based on LTE RAN capacity/resource information 640. Resource availability information 860 may include, for example, a number of base stations, a number of other devices, etc. associated with LTE RAN 120. Resource allocator 820 of PCRF 350 may determine LTE resource allocation 880 based on capacity information 850 and resource availability information 860. LTE resource allocation 880 may include information defining which resources of LTE RAN 120 (e.g., base station 300) to use to route traffic (e.g., voice, data, etc.) to/from user equipment (e.g., mobile telephones).

Process blocks 1010 and 1050 may include the process blocks illustrated in FIG. 11. As shown in FIG. 11, process blocks 1010 and 1050 may include establishing a first direct interface to the RNC (block 1100), and receiving capacity/resource information for one or more base stations associated with the RNC, via the first direct interface (block 1110). For example, in implementations described above in connection with FIG. 6, PCRF 350 may include direct interface 610 to RNC 210 (e.g., of CDMA RAN 110). Interface 610 may provide a wired or wireless communication link between RNC 210 and PCRF 350 so that capacity, resources, and capabilities of CDMA RAN 110 may be provided to and/or be known by PCRF 350. Base station 200 (and/or other devices associated with CDMA RAN 110) may provide CDMA RAN capacity/resource information 630 to RNC 210. CDMA RAN capacity/resource information 630 may include capacity information (e.g., number of cells, number of voice channels, percent of cells in use, percent of voice channels in use, etc.), resource availability information (e.g., number of base stations, number of other devices, etc.), etc. associated with CDMA RAN 110. RNC 210 may forward CDMA RAN capacity/resource information 630 to PCRF 350 via interface 610.

As further shown in FIG. 11, process blocks 1010 and 1050 may include establishing a second direct interface to the MME (block 1120), and receiving capacity/resource information for one or more base stations associated with the MME, via the second direct interface (block 1130). For example, in implementations described above in connection with FIG. 6, PCRF 350 may include direct interface 620 to MME 310 (e.g., of LTE RAN 120). Interface 620 may provide a wired or wireless communication link between MME 310 and PCRF 350 so that capacity, resources, and capabilities of LTE RAN 120 may be provided to and known by PCRF 350. Base station 300 (and/or other devices associated with LTE RAN 120) may provide LTE RAN capacity/resource information 640 to MME 310. LTE RAN capacity/resource information 640 may include capacity information (e.g., number of cells, number of voice channels, percent of cells in use, percent of voice channels in use, etc.), resource availability information (e.g., number of base stations, number of other devices, etc.), etc. associated with LTE RAN 120. MME 310 may forward LTE RAN capacity/resource information 640 to PCRF 350 via interface 620.

FIG. 12 depicts a flow chart of another exemplary process 1200 for determining RAN capacity and/or resources and for allocating RAN resources according to implementations described herein. In one implementation, process 1200 may be performed by PGW 340. In another implementation, some or all of process 1200 may be performed by another device or group of devices, including or excluding PGW 340.

As illustrated in FIG. 12, process 1200 may include receiving CDMA capacity status information from a RNC of a CDMA RAN (block 1210), and determining a capacity associated with the CDMA RAN based on the CDMA capacity status information (block 1220). For example, in implementations described above in connection with FIG. 9, CDMA information receiver 900 of PGW 340 may receive CDMA RAN capacity status information 710 from HSGW 330 (e.g., as provided by RNC 210), and may generate capacity information 930 based on CDMA RAN capacity status information 710. Capacity information 930 may include, for example, a number of cells, a number of voice channels, a percent of cells in use, a percent of voice channels in use, etc. associated with CDMA RAN 110.

As further shown in FIG. 12, resource availability associated with the CDMA RAN may be determined based on the CDMA capacity status information (block 1230), and a resource allocation associated with the CDMA RAN may be determined based on the CDMA RAN capacity and the CDMA RAN resource availability (block 1240). For example, in implementations described above in connection with FIG. 9, CDMA information receiver 900 of PGW 340 may generate resource availability information 940 based on CDMA RAN capacity status information 710. Resource availability information 940 may include, for example, a number of base stations, a number of other devices, etc. associated with CDMA RAN 110. Resource allocator 920 of PGW 340 may determine CDMA resource allocation 970 based on capacity information 930 and resource availability information 940. CDMA resource allocation 970 may include information defining which resources of CDMA RAN 110 (e.g., base station 200) to use to route traffic (e.g., voice, data, etc.) to/from user equipment (e.g., mobile telephones).

Returning to FIG. 12, LTE capacity status information may be received from a base station of a LTE RAN (block 1250), and a capacity associated with the LTE RAN may be determined based on the LTE capacity status information (block 1260). For example, in implementations described above in connection with FIG. 9, LTE information receiver 910 of PGW 340 may receive LTE RAN capacity status information 720 from SGW 320 (e.g., as provided by base station 300), and may generate capacity information 950 based on LTE RAN capacity status information 720. Capacity information 950 may include, for example, a number of cells, a number of voice channels, a percent of cells in use, a percent of voice channels in use, etc. associated with LTE RAN 120.

As further shown in FIG. 12, resource availability associated with the LTE RAN may be determined based on the LTE capacity status information (block 1270), and a resource allocation associated with the LTE RAN may be determined based on the LTE RAN capacity and the LTE RAN resource availability (block 1280). For example, in implementations described above in connection with FIG. 9, LTE information receiver 910 of PGW 340 may generate resource availability information 960 based on LTE RAN capacity status information 720. Resource availability information 960 may include, for example, a number of base stations, a number of other devices, etc. associated with LTE RAN 120. Resource allocator 920 of PGW 340 may determine LTE resource allocation 980 based on capacity information 950 and resource availability information 960. LTE resource allocation 980 may include information defining which resources of LTE RAN 120 (e.g., base station 300) to use to route traffic (e.g., voice, data, etc.) to/from user equipment (e.g., mobile telephones).

Implementations described herein may provide systems and/or methods that determine RAN conditions (e.g., capacity and/or resources) and provide the RAN conditions to other network components (e.g., to a PCRF device). In one implementation, for example, the systems and/or methods may receive CDMA capacity/resource information from a RNC of a CDMA RAN, may determine CDMA RAN capacity and resource availability based on the CDMA capacity/resource information, and may allocate CDMA RAN resources based on the CDMA RAN capacity and resource availability. Furthermore, the systems and/or methods may receive LTE capacity/resource information from a MME of a LTE RAN, may determine LTE RAN capacity and resource availability based on the LTE capacity/resource information, and may allocate LTE RAN resources based on the LTE RAN capacity and resource availability.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-12, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code--it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method comprising:
   receiving, by the computing device, code division multiple access (CDMA) capacity/resource information via a first direct interface with a radio network controller (RNC) associated with a CDMA radio access network (RAN);
   determining, by the computing device and based on the CDMA capacity/resource information, a capacity associated with the CDMA RAN;
   determining, by the computing device and based on the CDMA capacity/resource information, a resource availability associated with the CDMA RAN;
   determining, by the computing device and based on the capacity and the resource availability associated with the CDMA RAN, a CDMA RAN resource allocation;
   receiving, by the computing device, long term evolution (LTE) capacity/resource information via a second direct interface with a mobility management entity (MME) associated with a LTE radio access network (RAN);
   determining, by the computing device and based on the LTE capacity/resource information, a capacity associated with the LTE RAN;
   determining, by the computing device and based on the LTE capacity/resource information, a resource availability associated with the LTE RAN;
   determining, by the computing device and based on the capacity and the resource availability associated with the LTE RAN, a LTE RAN resource allocation; and
   allocating, by the computing device, resources based on the determined CDMA RAN resource allocation and based on the determined LTE RAN resource allocation.

2. The computing device-implemented method of claim 1, further comprising:
   allocating resources in the CDMA RAN based on the CDMA RAN allocation.

3. The computing device-implemented method of claim 1, further comprising:
   establishing the first direct interface between the computing device and the RNC; and
   receiving, via the direct interface, capacity/resource information for one or more base stations associated with the RNC.

4. The computing device-implemented method of claim 1, where, when allocating resource, the method further includes:
   allocating resources in the LTE RAN based on the LTE RAN allocation.

5. The computing device-implemented method of claim 1, further comprising:
   establishing the second direct interface between the computing device and the MME; and
   receiving, via the direct interface, capacity/resource information for one or more base stations associated with the MME.

6. The computing device-implemented method of claim 1, where the LTE capacity/resource information includes one or more of:
   a number of cells associated with the LTE RAN,
   a number of voice channels associated with the LTE RAN,
   a percent of cells in use in the LTE RAN,
   a percent of voice channels in use in the LTE RAN, or
   a number of base stations associated with the LTE RAN.

7. The computing device-implemented method of claim 1, where the computing device comprises a policy and charging rules function (PCRF) device.

8. The computing device-implemented method of claim 1, where the CDMA capacity/resource information includes one or more of:
   a number of cells associated with the CDMA RAN,
   a number of voice channels associated with the CDMA RAN,
   a percent of cells in use in the CDMA RAN,
   a percent of voice channels in use in the CDMA RAN, or
   a number of base stations associated with the CDMA RAN.

9. A computing device-implemented method comprising:
   receiving, by the computing device, code division multiple access (CDMA) capacity status information from a radio network controller (RNC) associated with a CDMA radio access network (RAN);

determining, by the computing device and based on the CDMA capacity status information, a capacity associated with the CDMA RAN;

determining, by the computing device and based on the CDMA capacity status information, a resource availability associated with the CDMA RAN;

determining, by the computing device and based on the capacity and the resource availability associated with the CDMA RAN; a CDMA RAN resource allocation;

receiving, by the computing device, long term evolution (LTE) capacity status information from a base station associated with a LTE radio access network (RAN);

determining, by the computing device and based on the LTE capacity status information, a capacity associated with the LTE RAN;

determining, by the computing device and based on the LTE capacity status information, a resource availability associated with the LTE RAN;

determining, by the computing device and based on the capacity and the resource availability associated with the LTE RAN, a LTE RAN resource allocation; and allocating, by the computing device, resources in the CDMA RAN based on the CDMA RAN allocation and resources in the LTE RAN based on the LTE RAN allocation.

10. The computing device-implemented method of claim 9, where the CDMA capacity status information includes one or more of:
   a number of cells associated with the CDMA RAN,
   a number of voice channels associated with the CDMA RAN,
   a percent of cells in use in the CDMA RAN,
   a percent of voice channels in use in the CDMA RAN, or
   a number of base stations associated with the CDMA RAN.

11. The computing device-implemented method of claim 9, where the LTE capacity status information includes one or more of:
   a number of cells associated with the LTE RAN,
   a number of voice channels associated with the LTE RAN,
   a percent of cells in use in the LTE RAN,
   a percent of voice channels in use in the LTE RAN, or
   a number of base stations associated with the LTE RAN.

12. The computing device-implemented method of claim 9, where the computing device comprises a packet data network gateway (PGW).

13. A device, comprising:
   a memory to store a plurality of instructions; and
   a processor to execute instructions in the memory to:
      establish a first direct interface between the device and a radio network controller (RNC) associated with a code division multiple access (CDMA) radio access network (RAN),
      receive CDMA capacity/resource information via the first direct interface,
      determine, based on the CDMA capacity/resource information, a capacity associated with the CDMA RAN,
      determine, based on the CDMA capacity/resource information, a resource availability associated with the CDMA RAN,
      determine, based on the capacity and the resource availability associated with the CDMA RAN, a CDMA RAN resource allocation,
      receive LTE capacity/resource information,
      determine, based on the LTE capacity/resource information, a capacity associated with the LTE RAN,
      determine, based on the LTE capacity/resource information, a resource availability associated with the LTE RAN,
      determine, based on the capacity and the resource availability associated with the LTE RAN, a LTE RAN resource allocation, and
      allocate resources based on the CDMA RAN allocation and the LTE RAN resource allocation.

14. The device of claim 13, where the processor is further to execute instructions in the memory to:
   allocate the resources in the CDMA RAN based on the CDMA RAN allocation.

15. The device of claim 13, where the CDMA capacity/resource information comprises capacity/resource information for one or more base stations associated with the RNC.

16. The device of claim 13, where the processor is further to execute instructions in the memory to:
   establish a second direct interface between the device and a mobility management entity (MME) associated with a long term evolution (LTE) radio access network (RAN), and
   receive the LTE capacity/resource information via the second direct interface.

17. The device of claim 13, where the processor is further to execute instructions in the memory to:
   allocate the resources in the LTE RAN based on the LTE RAN allocation.

18. The device of claim 13, where the LTE capacity/resource information comprises capacity/resource information for one or more base stations associated with the MME.

19. The device of claim 13, where the LTE capacity/resource information includes one or more of:
   a number of cells associated with the LTE RAN,
   a number of voice channels associated with the LTE RAN,
   a percent of cells in use in the LTE RAN,
   a percent of voice channels in use in the LTE RAN, or
   a number of base stations associated with the LTE RAN.

20. The device of claim 13, where:
   the CDMA resource allocation comprises information defining which resources of the CDMA RAN to use to route traffic, and
   the LTE RAN resource allocation comprises information defining which resources of the LTE RAN to use to route traffic.

21. The device of claim 13, where the CDMA capacity/resource information includes one or more of:
   a number of cells associated with the CDMA RAN,
   a number of voice channels associated with the CDMA RAN,
   a percent of cells in use in the CDMA RAN,
   a percent of voice channels in use in the CDMA RAN, or
   a number of base stations associated with the CDMA RAN.

22. The device of claim 13, where the device comprises a policy and charging rules function (PCRF) device.

23. A device, comprising:
   means for receiving code division multiple access (CDMA) capacity/resource information via a first direct interface with a radio network controller (RNC) associated with a CDMA radio access network (RAN);
   means for determining, based on the CDMA capacity/resource information, a capacity associated with the CDMA RAN;
   means for determining, based on the CDMA capacity/resource information, a resource availability associated with the CDMA RAN;

means for determining, based on the capacity and the resource availability associated with the CDMA RAN, a CDMA RAN resource allocation;

means for receiving long term evolution (LTE) capacity/resource information via a second direct interface with a mobility management entity (MME) associated with a LTE radio access network (RAN);

means for determining, based on the LTE capacity/resource information, a capacity associated with the LTE RAN;

means for determining, based on the LTE capacity/resource information, a resource availability associated with the LTE RAN;

means for determining, based on the capacity and the resource availability associated with the LTE RAN, a LTE RAN resource allocation; and means for allocating resources based on the determined CDMA RAN resource allocation and based on the determined LTE RAN resource allocation.

24. The device of claim 23, further comprising:
means for allocating the resources in the LTE RAN based on the LTE RAN allocation.

25. The device of claim 23, further comprising:
means for allocating the resources in the CDMA RAN based on the CDMA RAN resource allocation.

* * * * *